May 26, 1964

M. ANDERSON 3,134,578

TETRAPODAL MIXING DEVICE

Filed Jan. 3, 1961

INVENTOR
*Martin Anderson* ial Patent Office 3,134,578
Patented May 26, 1964

3,134,578
TETRAPODAL MIXING DEVICE
Martin Anderson, 1-H Gardenway, Greenbelt, Md.
Filed Jan. 3, 1961, Ser. No. 80,489
3 Claims. (Cl. 259—89)

This invention is directed to a material mixing or blending apparatus, and its principal object is to provide a tetrapodal blending device.

Another object of this invention is to provide a mixing apparatus in the form of an anisoplanar, unitary, hollow, generally tetrapodal-shaped container having an axis of rotation passing through its center of gravity, one leg extending from a plane lying along the axis of rotation, and the remaining three legs extending and diverging oppositely therefrom in the general shape of a tripod.

An additional object of this invention is to provide a blending apparatus in the general shape of a tetrapod whereby the apparatus may be substantially discharged of its entire contents through at least one leg thereof.

A further object of this invention is to provide a mixing or blending device comprising a unitary hollow body in the general shape of a tetrapod having two transversely opposed, generally V-shaped, dipodal pairs of legs with a common axis of symmetry, and with one of the dipodal pair lying in the plane of rotation of the device.

A yet further object of this invention is to provide a mixer permitting, as a novel mode of blending in one cycle, the serial operations of splitting, blending, and pouring with substantial longitudinal inversion of a charge comprising two or more discrete particulate materials.

These and other objects and features of this invention are further described in detail below in connection with the accompanying drawings, in which like numerals designate like parts.

Figure 1:
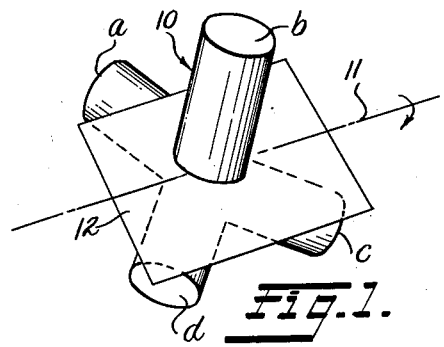
FIGURE 1 shows a slightly modified configuration of the invention wherein the three legs $a$, $d$, and $c$ of the blending device are below plane 12 and diverge oppositely therefrom to form the general shape of a tripod.

The slightly modified configuration of FIGURE 1 is shown as an anisoplanar, unitary, hollow body or container 10 comprising four mutually divergent, hollow legs or receptacles designated as $a$, $b$, $c$, and $d$ and extending radially outward from a central open apex portion, the hollow legs being connected at end edges thereof. The axis of rotation 11, which passes substantially through the center of gravity of container 10, lies in a plane 12 from one side of which there extends only one leg, shown as leg $b$, the remaining three legs, $a$, $d$, and $c$, diverging oppositely therefrom and having the general shape of a tripod. Container 10 of FIGURE 1 may then be resolved into six generally V-shaped, dipodal pairs of legs: $a$ and $b$, $a$ and $c$, $a$ and $d$, $b$ and $c$, $b$ and $d$, and $c$ and $d$, each of these six generally V-shaped dipodal pairs lying in a different dipodal plane, thus defining the term "anisoplanar" as used in this specification. As will be further described hereinbelow, one of the advantages of this configuration is that the entire contents of container 10 may be drained from at least one leg thereof.

Each leg defines relatively wide angles, although less than 180°, between itself and adjacent legs, and the sum of the angles between any four adjacent legs will be greater than 360°.

Figure 2:
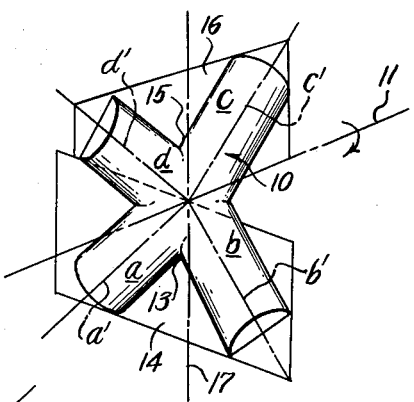
FIGURE 2 shows in diagram the preferred configuration of this invention.

In FIGURE 2, showing a preferred configuration of the present invention, there is formed by legs $a$ and $b$ a generally V-shaped first pair of legs 13 which define the dipodal plane 14 shown as bisecting each of legs $a$ and $b$ along the respective axes, $a'$ and $b'$, thereof. The plane of rotation of container 10, which lies in dipodal plane 14, may be more explicitly defined for the purposes of this specification as the plane swept out by the axes $a'$ or $b'$ upon rotation of container 10. Legs $c$ and $d$ form a generally V-shaped second pair of legs 15 defining dipodal plane 16, shown as bisecting each of legs $c$ and $d$ along the respective axes, $c'$ and $d'$, thereof. Plane 16 is symmetrically transverse, or orthogonal, to plane 14 and the plane of rotation and is oppositely disposed from plane 14 about common axis of symmetry 17. From FIGURE 2 it can be seen that the axes of the respective legs substantially intersect at a common point with axis of rotation 11 also substantially intersecting said common point transverse to plane 14. It can also be readily seen from FIGURE 1 that one leg, $a$ or $b$, for example, may be viewed as extending from a plane 12 lying along axis of rotation 11, with the remaining three legs diverging oppositely therefrom and having the general shape of a tripod.

Figure 3:
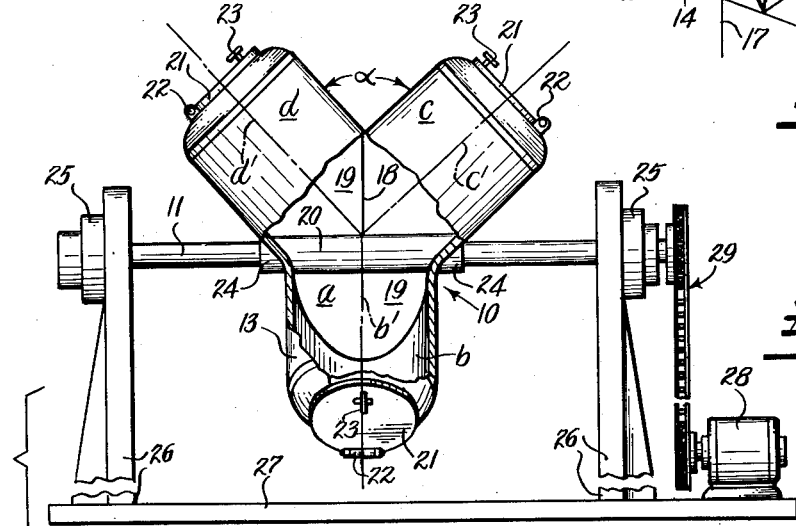
FIGURE 3 is a side elevation of the blending device embodying the preferred configuration of this invention, with parts broken away for purposes of illustration.

In FIGURE 3 there is shown as the preferred configuration of this invention an industrial mixing or blending apparatus 10 of generally tetrapodal shape with respect to mutually diverging cylindrical leg portions $a$, $b$, $c$, and $d$. The casing of container 10 is constructed of two similar half-sections, 13 and 15, of substantially equal volume, of a generally V-shape, and lying in mutually transverse planes, with half-section 13 being in the plane of rotation of container 10. Each half-section, 13 and 15, is formed respectively from the pair of cylindrical, diverging leg portions $a$, $b$, $c$, and $d$ lying in the corresponding plane. Each co-planar pair, $a$—$b$ and $c$—$d$, is respectively joined together, as by welding or any other suitable means, at obliquely cut-out end portions 18 making an angle $\alpha$ substantially less than 180°. Angle $\alpha$ is shown in FIGURE 3 as approximately 90° and is preferably in the range of 90° to 130°, as shown, or with respect to axes $d'$ and $c'$, within which limitation the device is defined for the purposes of this invention as a substantially regular tetrapod. In many respects, the most desirable angle $\alpha$ is 109.5°, in which case a true regular tetrapod is formed with each diverging leg portion, $a$, $b$, $c$, and $d$, being separated from each of the others by that angular distance. Angle $\alpha$ also defines charge-splitting means whereby the charge is split once during each blending cycle in cooperation with dipodal pair 15.

Each similar half-section, 13 and 15, further has the tip portion truncated to form an open apex portion 19 of a generally elliptical cross-section. The central open apex portion formed by portions 19 is thus connected at figurative end edges thereof with each of hollow leg sections $a$, $b$, $c$, and $d$. When open apex portions 19 terminate in substantially circular cross-section, they may be directly joined, as by welding or the like. It is often of advantage, however, to have open apex portions 19 joined by demountable coupling means, whereby half-sections 13 and 15 may be separated as necessary for shipping, cleaning, etc. When open apex portions 19 terminate in elliptical cross-sections, they may then be joined across an adapting means or connector 20 which may, if desired, serve also as a demountable coupling means. Adapting means or connector 20, as shown in this embodiment, includes the common point of substantial mutual intersection of axes $d'$, $c'$, $b'$ ($a'$ not being shown), and axis of rotation 11. Open apex portions 19 cooperate to form between the two half-sections an open common apex portion co-designated by numeral 20. The method of fabrication herein described is preferred and convenient but is not intended as limiting, and any other suitable means and method of construction may be used to manufacture the tetrapodal mixer of this invention. While the divergent leg portions have been described as cylindrical, it is to be understood that they may be tapered, frustroconical, etc., and of any other preferred cross-sectional form including polygonal, conical section, or the like. Although the two half-sections have been described as being of equal volume, it is within the scope of this invention to form them, where applicable, or unequal volumes.

Material-charging and discharging means for each or any leg portion may be provided of any preferred form and may, for example, comprise a port with a sealing cover plate 21 shown as hinged at 22, and provided with locking means 23. The ports adapted to be closed by cover plates 21 may be employed for charging container 10 with the materials to be blended and the discharge thereof. One advantage of the tetrapodal configuration of this invention, not available in isoplanar "four-legged" devices of the prior art, is that only one material-charging and discharging means, on either of leg portions $a$ or $b$, is needed for filling or completely emptying container 10 of its contents. For example, with angle $\alpha$ preferably not less than 90°, leg portions $b$, $c$, and $d$ may be completely drained of their contents through the port and opened cover plate 21 of leg portion $a$ when container 10 has been rotated to place leg portion $b$ above the horizontal plane of the axis of rotation. The manner by which all of the leg portions may be discharged through only one of leg portions $a$ or $b$ of half-section 13 is shown schematically in positions 4B and 4D of FIGURE 4 where the downwardly pointing arrows indicate the direction of discharge. It is accordingly not at all necessary that leg portion $c$ and $d$ of half-section 15 be provided with material-charging and discharging means. When desirable for continuous, rather than batchwise, blending operations, appropriate material inlet and outlet means adapted for continual center feeding and discharging may be provided as, for example, through trunnion shafts 24. Also, for continuous operations a plurality of the tetrapodal devices of this invention may be joined together in series along a common axis of rotation.

Hollow container 10 may be mounted for rotation by a pair of aligned trunnions 24 extending laterally from the opposite sides of the casing of container 10. Trunnions 24 are arranged to turn on bearings 25 mounted on standards 26 disposed on either side of container 10 and supported in an erect position on base 27. Container 10 is rotated by a motor 28 connected to one of trunnions 24 by gear and chain arrangement 29. Other power and transmission systems, as a direct drive, gear train, etc., and other mounting means may, as will be understood, be alternatively employed.

Figure 4:
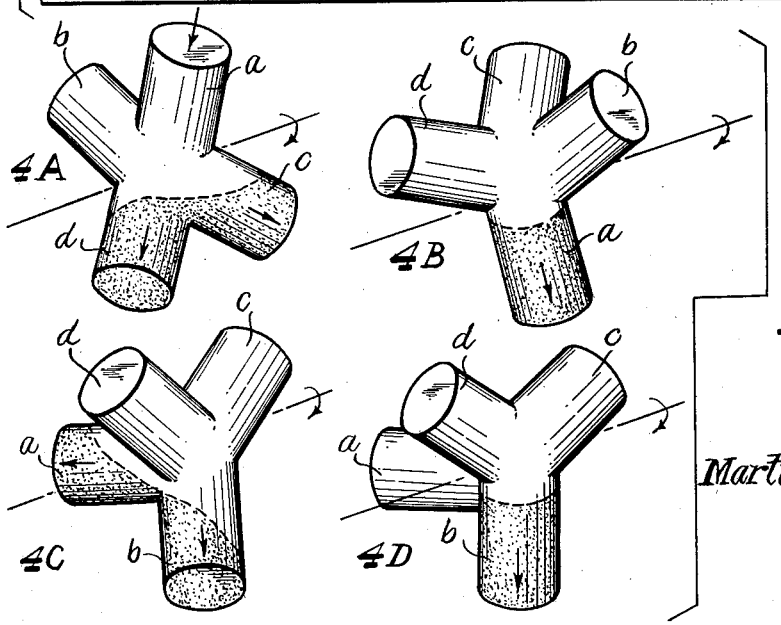
FIGURE 4 is schematically illustrative of the blending cycle achieved through the preferred configuration of this invention.

In this invention there may be achieved a novel and efficient blending cycle which includes the step of substantial longitudinal inversion of the charge, an advantage not available in the isoplanar X, Y, V, and L-shaped devies of the prior art. In FIGURE 4 there is illustrated schematically the blending cycle realized through the preferred configuration of this invention. In position 4A container 10 is shown, by shading, as having been filled through leg $a$ with a charge comprising two or more discrete substances to be blended and approximately equally divided between legs $c$ and $d$. The volume of charge added is in this example substantially equal to the volume of any one of legs $a$, $b$, $c$, or $d$. With rotation to position 4B the materials of the separate half charges in legs $c$ and $d$ converge and discharge into leg $a$, being thereby subjected to a blending step by being driven into and through each other in passage. As rotation continues, the contents of leg $a$ are poured into leg $b$ as shown in position 4C, thus adding an additional mode of blending. This pouring process also permits substantial longitudinal inversion of the charge whereby, for example, a particle at the top or bottom of leg $a$ will in all probability tend to reappear at the bottom or top respectively of leg $b$. At position 4D the charge is shown as having been completely poured into leg $b$. The cycle is completed upon returning to position 4A, whereby the substantially inverted charge is split into approximately equal portions.

The apparatus of this invention is especially useful in the blending of two or more pulverulent, granular, particulate, or fibrous materials. It may further be used to mix liquids, slurries, etc., to dissolve solids in liquids, to prepare suspensions, and as a chemical reactor. It is valuable in the compounding of foods, pharmaceuticals, fertilizers, etc., and for a variety of operations including agitating, granulating, tumbling, drying, churning, etc., as well as mixing the blending.

I claim:
1. An apparatus for blending materials comprising a unitary hollow container having four intersecting and substantially cylindrical hollow leg sections disposed in diverging directions and forming a central open apex portion, said leg sections being connected at end edges of said open apex portion and having four longitudinal axes substantially intersecting at a common point in said open apex portion, two of said longitudinal axes lying in a first plane and defining a first pair of leg sections of V-shape configuration and the other two of said longitudinal axes lying in a second plane and defining a second pair of leg sections of V-shape configuration, said second plane being transverse to said first plane at said common point of intersection of said axes in said open apex portion, an axis of rotation substantially intersecting said common point of intersection and being disposed transverse to said second plane, the axes of said first and second planes, respectively, diverging at an angle substantially within the range of 90° to 130°, whereby the entire contents of said container may be discharged through only one leg section thereof.

2. The apparatus of claim 1 wherein said apparatus further comprises means for mounting said container and for rotating said container about said axis of rotation.

3. The apparatus of claim 1 wherein the axes of said first and second planes, respectively, diverge by an angle of approximately 109.5°.

References Cited in the file of this patent
UNITED STATES PATENTS

| 2,899,181 | Weydanz | Aug. 11, 1959 |
| 2,901,227 | Russum | Aug. 25, 1959 |

FOREIGN PATENTS

| 837,345 | Great Britain | June 9, 1960 |
| 862,961 | Great Britain | of 1961 |